Oct. 23, 1928.
W. H. KAMMERER
1,688,971
SOIL WORKING IMPLEMENT
Filed Nov. 13, 1925
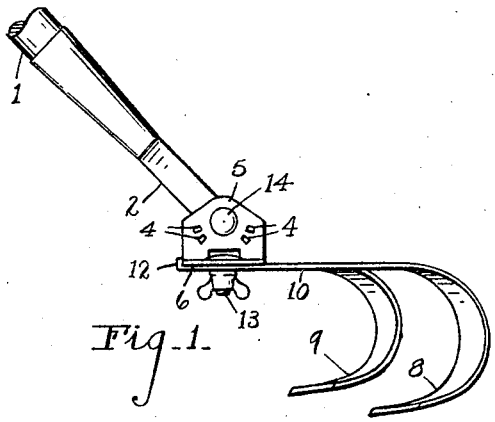
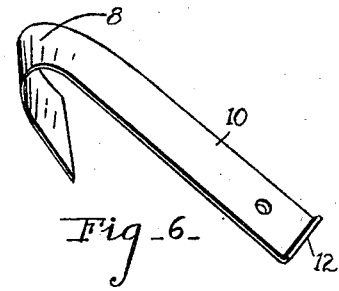
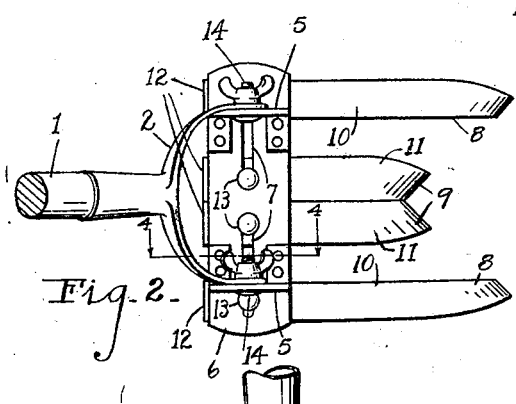
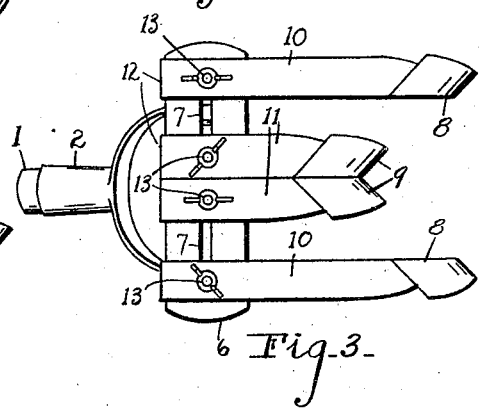
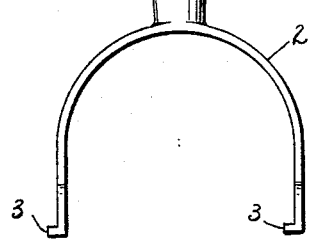
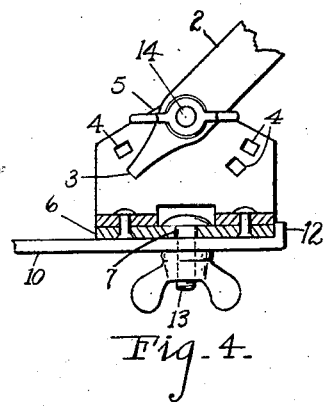
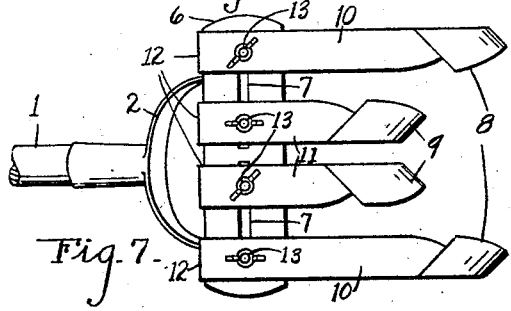
INVENTOR
William H. Kammerer
BY Chappell & Earl
ATTORNEYS Patented Oct. 23, 1928.

1,688,971

UNITED STATES PATENT OFFICE.

WILLIAM H. KAMMERER, OF KALAMAZOO, MICHIGAN.

SOIL-WORKING IMPLEMENT.

Application filed November 13, 1925. Serial No. 68,846.

My improvements in soil working implements are especially designed by me for embodiment in a hand tool provided with a handle although they are readily adapted for use in hand cultivators provided with wheels.

The main object of this invention is to provide an improved hand soil working implement which is highly efficient and readily adapted for use in a great variety of relations.

Objects relating to details and economies of construction and operation of my invention will definitely appear from the detailed description to follow.

The invention is defined and pointed out in the claims.

A structure which is a preferred embodiment of my invention is illustrated in the accompanying drawing, forming a part of this application, in which:

Fig. 1 is a side elevation of a hand soil working implement embodying the features of my invention, the handle being partially broken away.

Fig. 2 is a top view with the handle partially cut away.

Fig. 3 is an inverted or bottom view with the handle partially cut away.

Fig. 4 is a detail section on a line corresponding to line 4—4 of Fig. 2.

Fig. 5 is a fragmentary view of the shank of the handle.

Fig. 6 is a perspective view of one of the teeth.

Fig. 7 is an inverted view corresponding to Fig. 3 with the teeth adjusted to another position.

In the drawing similar reference characters refer to similar parts throughout the several views.

Referring to the drawing, I provide a handle 1 having a forked shank 2, the arms of the shank terminating in lugs 3 adapted to be selectively engaged in the holes 4 of the ears 5 projecting upwardly from the head bar 6. This head bar has longitudinal slots 7 therein.

The teeth, in the embodiment illustrated, are arranged in pairs, there being two of the teeth 8 and two of the teeth 9. These teeth have longitudinal shanks 10 and 11 respectively, the shanks 10 being substantially longer than the shanks 11. The shanks terminate in upturned lugs 12 at their ends which engage the front edge of the head bar. Bolts 13 are arranged through the shanks and through the slots for adjustably and interchangeably securing the teeth to the head bar, the lugs 12 coacting with the bolts in supporting the teeth.

The teeth have lateral twists or moldboard curves therein so that they turn and deflect the soil somewhat like a plow although the teeth are relatively narrow as compared with a plow and do not have the wing extensions common to plows. The pairs of teeth may be arranged as shown in Figs. 2 and 3 with the central teeth having the short shanks disposed edge to edge and with their throws in opposite direction or they may be separated as shown in Fig. 7. The outer teeth may be arranged with their throws inwardly as shown in Fig. 7 or outwardly as shown in Fig. 3 and the position of the teeth may be otherwise changed according to the work that is to be performed. For instance, in the cultivation of small vegetables, it is desirable that the throw of the outer teeth shall be inward so that the soil may be worked close to the vegetables without covering the same, and as the size of the vegetables increases it is frequently desirable to throw the dirt toward them and the outer teeth may be arranged, as shown in Fig. 3. The inner teeth may be adjusted for forming a furrow or for throwing the dirt in the direction desired.

The handle is preferably adjustable and may be adjusted by loosening the bolts 14 and engaging the lugs 3 in the different holes 4, the bolts being again tightened.

I have illustrated and described my improvements in an embodiment which I have found highly satisfactory.

I have not attempted to illustrate and describe other embodiments or adaptations as I believe the disclosure made will enable those skilled in the art or desiring to use the tool to adapt my improvements as may be desired.

Having thus described my invention, what I claim as new and desire to secure by Letters Patent, is:

1. In a soil working implement, the combination of a head bar having longitudinal slots therein, pairs of curved teeth provided with integral shanks having lugs at their ends engaging the front edge of said head bar, said teeth having lateral twists in their curved portions, the shanks of the pairs of teeth being of different length, and bolts through said shanks engaging said slots in said head bar for adjustably and interchangeably securing said teeth thereto.

2. In a soil working implement, the combination of a head bar having longitudinal slots therein, curved teeth provided with integral shanks having lugs at their ends engaging the front edge of said head bar, said teeth having lateral twists in their curved portions, and bolts through said shanks engaging said slots in said head bar for securing said teeth thereto.

3. In a soil working implement the combination of a head bar, pairs of curved teeth of approximately uniform width from end to end having horizontal shank portions and terminating in approximately horizontal blade portions, the curved portion between said shank and blade portions having lateral twists therein, and means for adjustably and interchangeably securing said pairs of teeth to said head bar with their throws in opposite relations.

In witness whereof I have hereunto set my hand.

WILLIAM H. KAMMERER.